(12) United States Patent
Sellinger et al.

(10) Patent No.: US 9,079,570 B2
(45) Date of Patent: Jul. 14, 2015

(54) "BRAKE-BY-WIRE" TYPE BRAKE SYSTEM

(75) Inventors: Thomas Sellinger, Offenbach (DE); Peter Drott, Frankfurt am Main (DE); Horst Krämer, Ginsheim-Gustavsburg (DE)

(73) Assignee: Continental Teves AG & Co. oHG (DE)

( * ) Notice: Subject to any disclaimer, the term of this patent is extended or adjusted under 35 U.S.C. 154(b) by 207 days.

(21) Appl. No.: 13/144,331

(22) PCT Filed: Jan. 14, 2010

(86) PCT No.: PCT/EP2010/050368
§ 371 (c)(1),
(2), (4) Date: Sep. 15, 2011

(87) PCT Pub. No.: WO2010/081840
PCT Pub. Date: Jul. 22, 2010

(65) Prior Publication Data
US 2012/0007419 A1    Jan. 12, 2012

(30) Foreign Application Priority Data

Jan. 15, 2009 (DE) .......................... 10 2009 000 235
May 7, 2009 (DE) .......................... 10 2009 002 885

(51) Int. Cl.
*B60T 13/74* (2006.01)
*B60T 7/04* (2006.01)
(Continued)

(52) U.S. Cl.
CPC .................. *B60T 7/042* (2013.01); *B60T 8/409* (2013.01); *B60T 8/4077* (2013.01); *B60T 13/573* (2013.01); *B60T 13/662* (2013.01); *B60T 13/745* (2013.01)

(58) Field of Classification Search
CPC ...... B60T 8/409; B60T 8/4081; B60T 8/4086
USPC .................. 188/358, 359, 360; 303/2, 3, 122, 303/122.04, 122.05, 122.09, 122.12, 303/122.13, 114.1, 115.1; 60/550, 554
See application file for complete search history.

(56) References Cited

U.S. PATENT DOCUMENTS 5,865,510 A    2/1999  Poertzgen
6,354,671 B1 *  3/2002  Feldmann et al. .............. 303/15
(Continued)

FOREIGN PATENT DOCUMENTS

DE    69515875 T2    7/2000
DE    10230865       2/2004
(Continued)

OTHER PUBLICATIONS

German Search Report issued in related Application No. DE 10 2010 000 882.6 dated May 5, 2010.
(Continued)

*Primary Examiner* — Nicholas J Lane
(74) *Attorney, Agent, or Firm* — RatnerPrestia

(57) ABSTRACT

A "brake-by-wire" type brake system for a motor vehicle, having a brake pressure sensor which can be activated by a brake pedal of a pedal unit and can be connected to wheel brakes of the vehicle outside the "brake-by-wire" operating mode, having a pressure source which can be actuated by an electronic control unit and can be connected to the wheel brakes of the vehicle in the "brake-by-wire" operating mode, and having a pedal travel simulator which interacts with the brake pedal and is formed by at least one simulator element, and a restoring force which acts on the brake pedal independently of the actuation of the pressure source can be simulated in the "brake-by-wire" operating mode. In order to provide a simpler and more cost-effective "brake-by-wire" type brake system, a force/travel characteristic of the pedal travel simulator is provided in a controllable fashion.

15 Claims, 12 Drawing Sheets

(51) Int. Cl.
*B60T 8/40* (2006.01)
*B60T 13/573* (2006.01)
*B60T 13/66* (2006.01)

(56) References Cited

U.S. PATENT DOCUMENTS

| | | | |
|---|---|---|---|
| 6,367,886 B1 * | 4/2002 | Shaw | 303/3 |
| 6,672,685 B2 * | 1/2004 | Ishimura et al. | 303/113.4 |
| 7,322,657 B2 * | 1/2008 | Matsuhashi | 303/113.4 |
| 7,357,465 B2 * | 4/2008 | Young et al. | 303/113.1 |
| 8,267,487 B2 * | 9/2012 | Kim | 303/122.11 |
| 8,449,047 B2 * | 5/2013 | Drumm et al. | 303/115.4 |
| 2002/0117893 A1 * | 8/2002 | Shaw et al. | 303/113.4 |
| 2006/0163941 A1 | 7/2006 | Von Hayn | |
| 2008/0010985 A1 * | 1/2008 | Miyazaki et al. | 60/565 |
| 2008/0196983 A1 | 8/2008 | Von Hayn | |
| 2008/0223670 A1 * | 9/2008 | Toyohira et al. | 188/152 |
| 2008/0258546 A1 * | 10/2008 | Drumm et al. | 303/115.4 |
| 2008/0265665 A1 * | 10/2008 | Drumm | 303/116.4 |
| 2008/0303340 A1 | 12/2008 | Crombez | |
| 2009/0090585 A1 * | 4/2009 | Sikorski | 188/1.11 E |
| 2010/0133897 A1 | 6/2010 | Von Hayn | |
| 2010/0200342 A1 * | 8/2010 | Drott et al. | 188/152 |
| 2012/0103452 A1 * | 5/2012 | Toyohira et al. | 138/31 |
| 2014/0000254 A1 * | 1/2014 | Murayama et al. | 60/533 |

FOREIGN PATENT DOCUMENTS

| | | | | |
|---|---|---|---|---|
| DE | 10358321 A1 | 6/2004 | | |
| DE | 102004011622 | 3/2005 | | |
| DE | 102007010513 | 11/2007 | | |
| DE | 102007016754 | 8/2008 | | |
| DE | 102007016975 A1 | 10/2008 | | |
| DE | 102008020940 A1 | 1/2009 | | |
| JP | 2003261014 A | * | 9/2003 | B60T 8/00 |
| JP | 2004330966 A | * | 11/2004 | B60T 11/12 |
| JP | 2006131224 A | * | 5/2006 | |
| WO | 2008107023 | 9/2008 | | |

OTHER PUBLICATIONS

International Search Report of PCT/EP2010/050368 filed Jan. 14, 2010, mailed Jun. 22, 2010.

* cited by examiner

Activation Direction

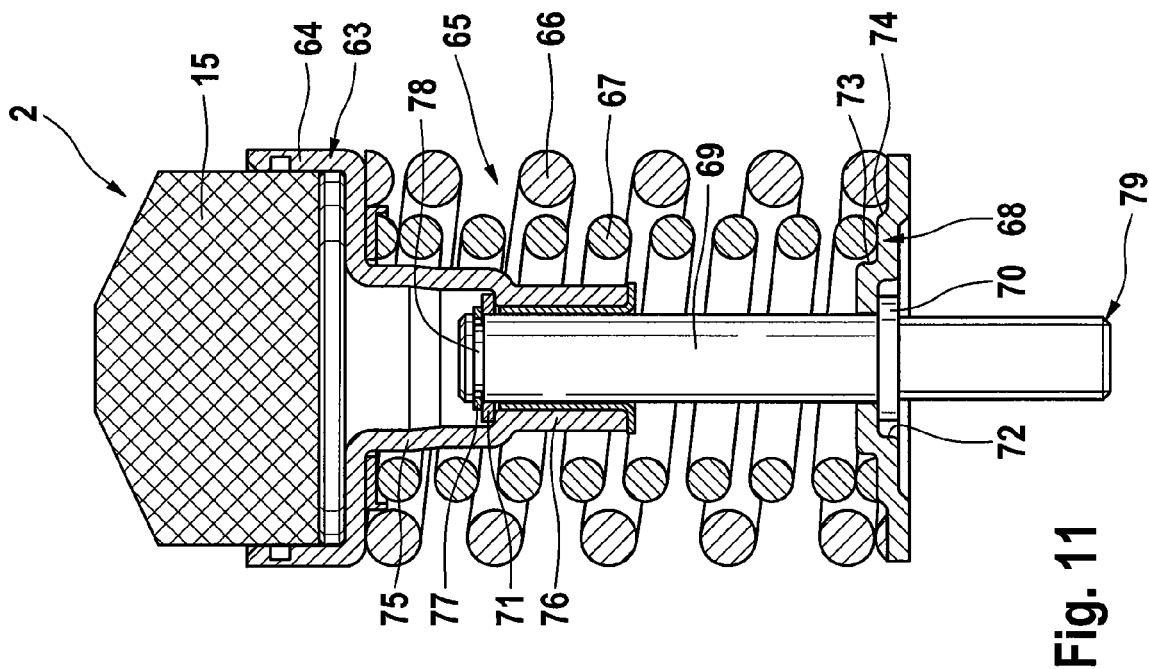
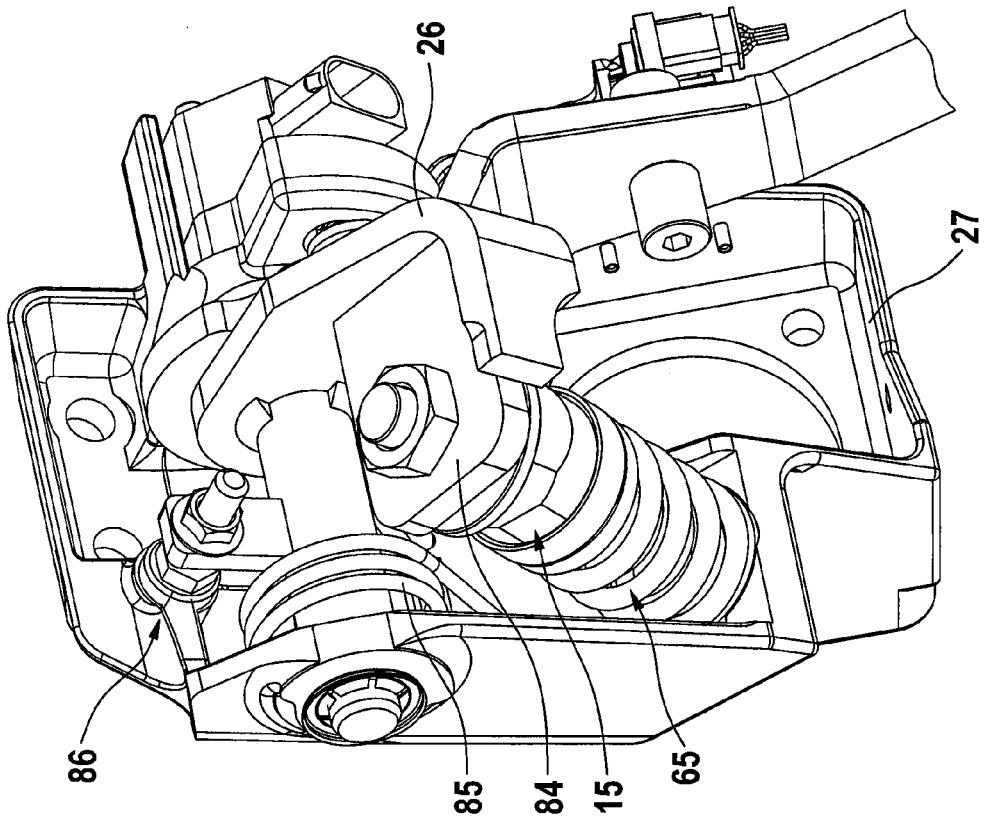
Fig. 11
Fig. 10

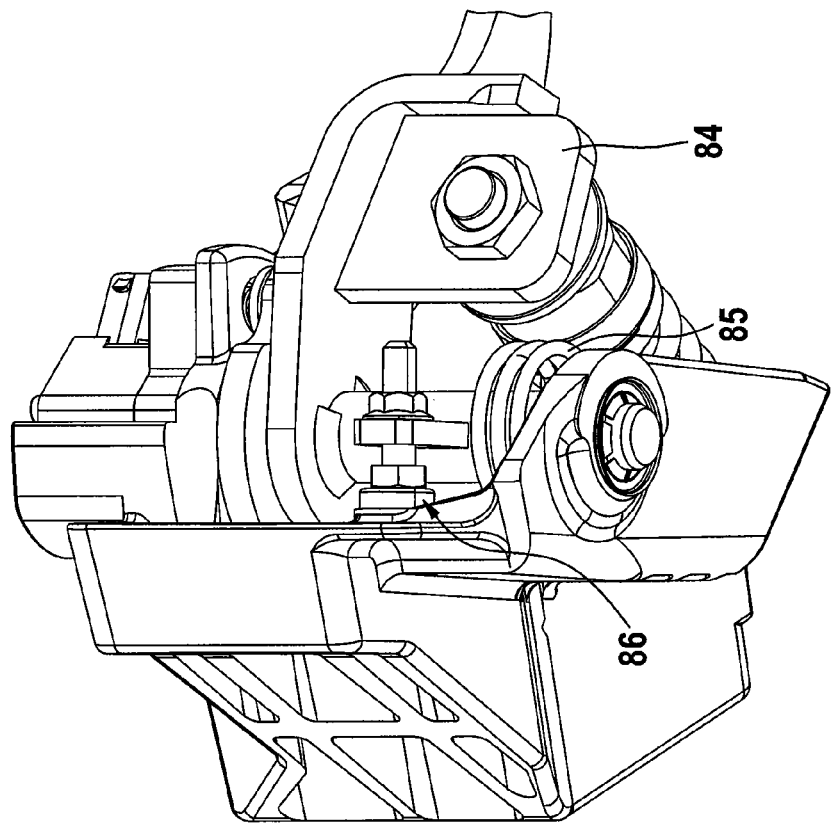
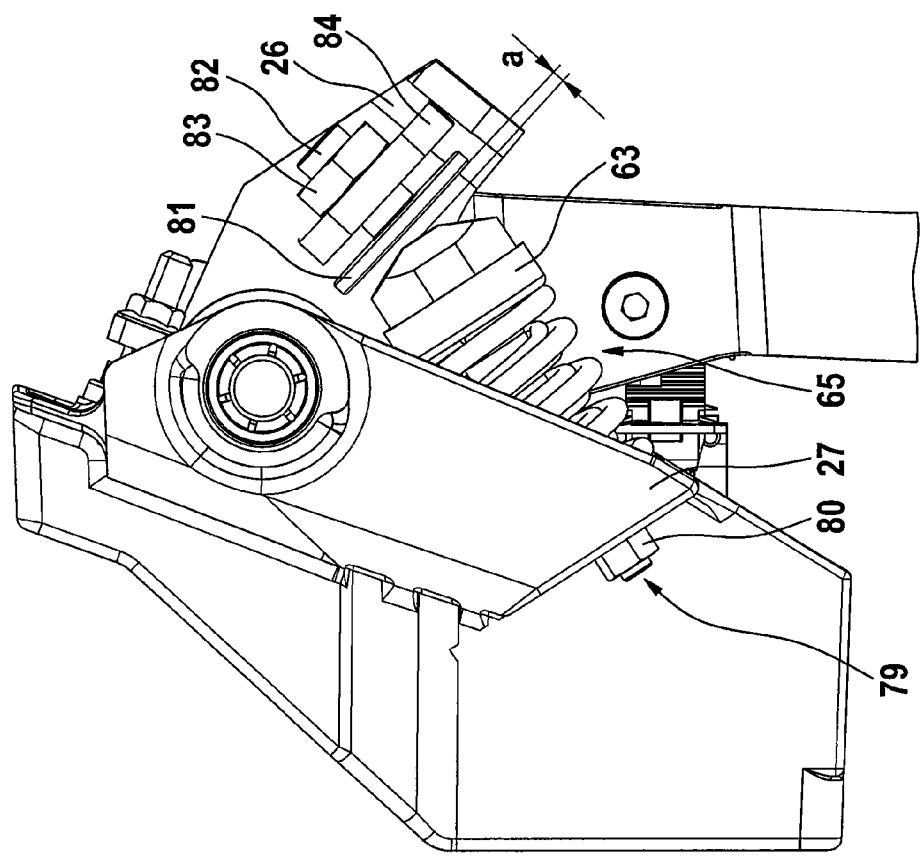
Fig. 13
Fig. 12

"BRAKE-BY-WIRE" TYPE BRAKE SYSTEM

CROSS REFERENCE TO RELATED APPLICATION

This application is the U.S. National Phase Application of PCT International Application No. PCT/EP2010/050368, filed Jan. 14, 2010, which claims priority to German Patent Application No. 10 2009 000 235.9, filed Jan. 15, 2009, and German Patent Application No. 10 2009 002 885.4, filed May 7, 2009, the contents of such applications being incorporated by reference herein.

FIELD OF THE INVENTION

A "brake-by-wire" type brake system for a motor vehicle, having a brake pressure generator which can be activated by means of a brake pedal of a pedal unit and can be connected to wheel brakes of the vehicle outside the "brake-by-wire" operating mode, having a pressure source which can be actuated by means of an electronic control unit and can be connected to the wheel brakes of the vehicle in the "brake-by-wire" operating mode, having means for detecting a driver's deceleration request, and having a pedal travel simulator which interacts with the brake pedal and is formed by at least one simulator element, and by means of which a restoring force which acts on the brake pedal independently of the actuation of the pressure source can be simulated in the "brake-by-wire" operating mode.

BACKGROUND OF THE INVENTION

The "brake-by-wire" type brake system for a motor vehicle, illustrated in FIG. 1, is known from the prior art and is composed essentially of a brake activation unit 10, a brake pedal 10, a pedal travel simulator 2, an electronic control unit 7, which is illustrated only schematically, and wheel brakes (not shown) which are connected to the brake activation unit 10 with the optional intermediate connection of a hydraulic open-loop or closed-loop control unit. The brake activation unit 10 is formed by a brake booster, preferably an underpressure brake booster 3, a master brake cylinder, for example a tandem master cylinder 4, which is connected downstream of the brake booster 3 and to whose pressure spaces (not illustrated) the abovementioned wheel brakes of the motor vehicle are connected, as well as a pressure medium reservoir vessel 5 which is assigned to the master brake cylinder 4. The brake pedal 1, which serves for the activation of the brake booster 3 by the driver, interacts with the pedal travel simulator 2, in particular in the "brake-by-wire" operating mode, which pedal travel simulator 2 gives the driver the desired brake pedal sensation. A sensor device 6, which is preferably of redundant design, for detecting a driver's deceleration request generates, as a function of the activation of the brake pedal 1, control signals which are fed to the electronic control unit 7, by means of the output signals of which control unit 7 it is possible, inter alia, to actuate an electromagnet (not illustrated) which is assigned to the brake booster 3 and which permits a pneumatic control valve to be activated independently of the driver's will, which pneumatic control valve controls an air supply to the brake booster 3. An axial gap which is provided between the end of a piston rod 8, coupled to the brake pedal 1, and a control piston of the abovementioned control valve ensures, in the "brake-by-wire" operating mode, decoupling of the force transmitting connection between the brake pedal 1 and the brake booster 3.

The pedal travel simulator 2, by means of which, as already mentioned, a restoring force which acts on the brake pedal is simulated in the "brake-by-wire" operating mode independently of activation of the brake booster 3, is embodied in such a way that in the "brake-by-wire" operating mode said pedal travel simulator 2 can be activated when the force transmitting connection between the brake pedal 1 and the brake booster 3 is decoupled, and can be deactivated outside the "brake-by-wire" operating mode. The activation and deactivation of the pedal travel simulator 2 are carried out by an electro-hydraulic device 9, which is formed essentially by a hydraulic cylinder-piston arrangement 11, 12 which can be shut off by means of a check valve 14 which can be activated electro-magnetically. The cylinder-piston arrangement 11, 12 has a hydraulic pressure space 12 which is bounded by a piston 11 and a hydraulic low pressure chamber 13 which is connected to the pressure space 12, wherein the check valve 14 permits the shutting off and the opening of the connection. The check valve 14, which can be activated or switched over by means of the actuation signals of the electronic control unit 7, is embodied as a 2/2-way valve which can be activated electro-magnetically and is open in the currentless state (SO). A nonreturn valve, which is open toward the pressure space 12 and which is not illustrated in FIG. 1, serves to equalize the pressure between the pressure space 12 and the low pressure chamber 13.

In the arrangement which is previously known from the prior art, the pedal travel simulator has a spring element 16 which is provided as a compression spring and which is clamped between the brake pedal 1 or a force transmitting part 17, which is connected in a rotationally fixed fashion to the brake pedal 1, and a two-armed lever 18. The two-armed lever 18 is mounted opposite the brake pedal 1, offset coaxially with respect thereto in such a way as to be rotatable to a limited degree, wherein the first arm 19 of said two-armed lever 18 forms a support face for the spring element 16, while the second arm 20 thereof is supported on the hydraulic piston 11 of the piston-cylinder arrangement 9.

The force transmitting part 17 interacts with an elastic simulator element 15, preferably manufactured from rubber, for the brake pedal 1. In order to generate a hysteresis which, during the rising stroke of the pedal travel simulator 2, generates frictional forces in addition to the force of the spring element 16, which frictional forces counteract the activation force acting on the brake pedal 1, a friction element 21 bears against the force transmitting part 17 under the effect of the spring element 16. The friction element 21 interacts with a friction face 22. The friction element 21 bears against the force transmitting part 17 by means of obliquely arranged bearing faces 23, 24, in such a way that during the activation of the pedal travel simulator 2 a force component is produced which presses the friction element 21 against the friction face 22. The abovementioned elements 16, 17, 21, 22 are preferably arranged in a housing 25 which is preferably embodied in one piece with the first arm 19 of the two-armed lever 18.

The method of functioning of the brake system described above is known to a person skilled in the art who is active in the technical field of "brake-by-wire" systems. In the position of rest of the brake system (illustrated in FIG. 1) which also corresponds to the fallback level, the hydraulic pressure space 12 of the electro-hydraulic device 9 is connected to the low pressure chamber 13 via the check valve 14 which is open in the currentless state. During the activation of the brake pedal 1, the movement thereof is detected by the sensor device 6 and signaled to the electronic control unit 7, which at the same time generates control signals for actuating the abovementioned electromagnet and the check valve 14, with the result that the connection between the pressure space 12 and the low pressure chamber 13 is interrupted, causing the pedal travel simulator 2 to be activated. The check valve 14 is therefore closed in the "brake-by-wire" operating mode, with the result that neither the arm 20 nor the housing 25 of the pedal simulator can move. When the brake pedal 1 is activated by the vehicle driver, the spring element 16 is therefore compressed. Outside the "brake-by-wire" operating mode the valve 14 is opened, and when the brake pedal 1 is activated the simulator housing 25 rotates along with the brake pedal 1, as a result of which the force applied by the vehicle driver is not absorbed in the pedal travel simulator 2 but rather acts on the underpressure brake booster 3.

In the event of failure of the vehicle electronics or failure of the on-board power system, the check valve 14 cannot be switched over, with the result that the braking occurs in the fallback level. When the brake pedal 1 is activated, the two-armed lever 18 rotates along with the brake pedal 1 under the effect of the spring element 16, with the result that the piston 11 of the electro-hydraulic device 9 is pushed to the left in the drawing and the pressure medium is pushed out of the pressure space 12 into the low pressure chamber 13. The simulator 2 is deactivated.

The basic design and the method of functioning of the "brake-by-wire" brake system are known as is described in the prior art, with the result that they are not included in the description of the following exemplary embodiments of a brake system according to the invention and details are only given on the differences according to aspects of the invention.

A brake-by-wire system is known from DE 10 2004 011 622 A1, which is incorporated by reference, and is described, in particular, in conjunction with FIG. 15 in said document. The pedal travel simulator is accommodated in the previously known brake system by a housing in which a force transmitting element which is connected in a rotationally fixed fashion to the brake pedal projects. An electro-hydraulic device which can be actuated by means of the electronic control unit and which is formed by a piston-cylinder arrangement permits activation of the pedal travel simulator in the "brake-by-wire" operating mode and at least partial deactivation of the pedal travel simulator outside the "brake-by-wire" operating mode by virtue of the fact that the housing of the pedal travel simulator is supported on the electro-hydraulic device by means of a lever arm which is securely connected to the housing. It is considered disadvantageous in the previously known brake system that the function of the electro-hydraulic device has to be monitored. In addition, the known system is costly and has a high number of components.

SUMMARY OF THE INVENTION

It is therefore an object of at least one embodiment of the present invention to provide a "brake-by-wire" type brake system which is more cost-effective, and has a simpler and more space-saving design.

There is provision here that a force/travel characteristic of the pedal travel simulator is provided in a controllable fashion. Controlling the pedal characteristic permits an additional travel with a limited force level to be enabled if the "brake-by-wire" system fails or a higher braking performance is necessary, with the result that the pedal travel simulator no longer has to be deactivated in the fallback level. It is therefore advantageous that there is no longer any need for a device for deactivating or activating the pedal travel simulator, and as a result of which the monitoring thereof is eliminated.

The control of the force/travel characteristic of the pedal travel simulator can preferably be provided in a force-dependent fashion, with the result that, starting from a predetermined foot force applied to the brake pedal, prolongation of the pedal travel is made possible and the reaction force which occurs in the process does not exceed a defined limiting value. Alternatively, the control of the force/travel characteristic of the pedal travel simulator, and therefore also of the pedal characteristic, could also be provided in a travel-dependent fashion.

An advantageous embodiment of the invention provides that the pedal travel simulator is coupled to a component, which is fixed to the vehicle, and to the brake pedal. In this context, the space which is present between the component, which is fixed to the vehicle, and the brake pedal can be used at least partially as an installation space for the pedal travel simulator.

Another advantageous embodiment of the invention provides, on the other hand, that the pedal travel simulator is arranged between a component, which is fixed to the vehicle, and a component which can rotate coaxially with respect to the brake pedal, as a result of which the dimensioning of the pedal travel simulator does not need to be adapted to the very limited installation space between the component, which is fixed to the vehicle, and the brake pedal.

The component which is fixed to the vehicle is preferably a part of the pedal unit, with the result that the pedal travel simulator can be provided as a component of the pre-mountable pedal unit.

Simple control of the pedal characteristic can advantageously be achieved in that, in order to prolong the pedal travel, a spring element is provided which, starting from a predetermined foot force applied to the brake pedal, can be compressed and therefore permits prolongation of the pedal travel.

According to one advantageous embodiment of the invention, the spring element is provided as one or more pre-stressed springs.

The prestressed spring element is preferably provided as a spring packet composed of disk springs or as at least one helical compression spring.

An alternative advantageous embodiment of the invention provides that the spring element is provided as an elastomer. In addition, it is conceivable within the scope of the invention to provide a combination of various spring types and a combination of springs and other sprung elements as a spring element.

An advantageously pre-mountable structural unit is made possible by virtue of the fact that the prestressed spring element is arranged secured between a first activation element, which supports the simulator element, and a second activation element.

According to one advantageous embodiment, a third activation element is provided onto which the simulator element is pressed and which is attached indirectly or directly to the brake pedal or to the component which can move coaxially with respect to the brake pedal.

A particularly simple design of the pedal travel simulator is achieved in accordance with one advantageous embodiment by virtue of the fact that the spring element is arranged between the component, which can rotate coaxially with respect to the brake pedal, and an activation element, and the simulator element is attached by means of a receptacle to the component which is fixed to the vehicle.

In order to be able to easily change the characteristic curve of the brake system in addition to the predefined properties of the other components of the pedal travel simulator, one advantageous embodiment of the invention provides that a distance is provided in an adjustable fashion between the simulator element and the third activation element.

A further advantageous embodiment of the invention provides that the second activation element is attached indirectly to the brake pedal or to the component which can move coaxially with respect to the brake pedal, and, in the "brake-by-wire" operating mode, the simulator element is pressed onto a side wall of a housing of the pedal travel simulator, wherein the prestressed spring element is arranged in series with a restoring spring of the brake pedal.

For the purpose of easily monitoring the pedal travel simulator stroke, according to one advantageous embodiment, it is possible to provide that the pedal travel simulator has a travel sensor.

The travel sensor preferably comprises a permanent magnet as a signal generator and a sensor element. However, other sensor variants can also be used within the scope of the invention.

The response force and restoring force of the brake pedal can easily be adapted to the different requirements by virtue of the fact that a restoring spring of the brake pedal is provided on the pedal travel simulator and/or as a separate spring element.

According to one advantageous embodiment of the invention, for the purpose of improved mounting of the pedal unit with the brake booster, a securing element, which has a funnel-shaped receptacle which is oriented in the direction of a piston rod of the brake booster, is attached to the brake pedal. At the same time, the arrangement serves for guiding the piston rod after mounting.

BRIEF DESCRIPTION OF THE DRAWINGS

The invention is best understood from the following detailed description when read in connection with the accompanying drawings. Included in the drawings are the following figures:

FIG. 10 shows an enlarged view of the pedal unit according to FIG. 8;

FIG. 11 shows part of the pedal travel simulator according to the fourth exemplary embodiment in accordance with FIGS. 8 to 10;

FIG. 12 shows a further view of the pedal unit according to the fourth exemplary embodiment;

FIG. 13 shows an enlarged illustration of the adjustment screw of the pedal unit according to FIG. 8;

DETAILED DESCRIPTION OF THE PREFERRED EMBODIMENT

Figure 1:
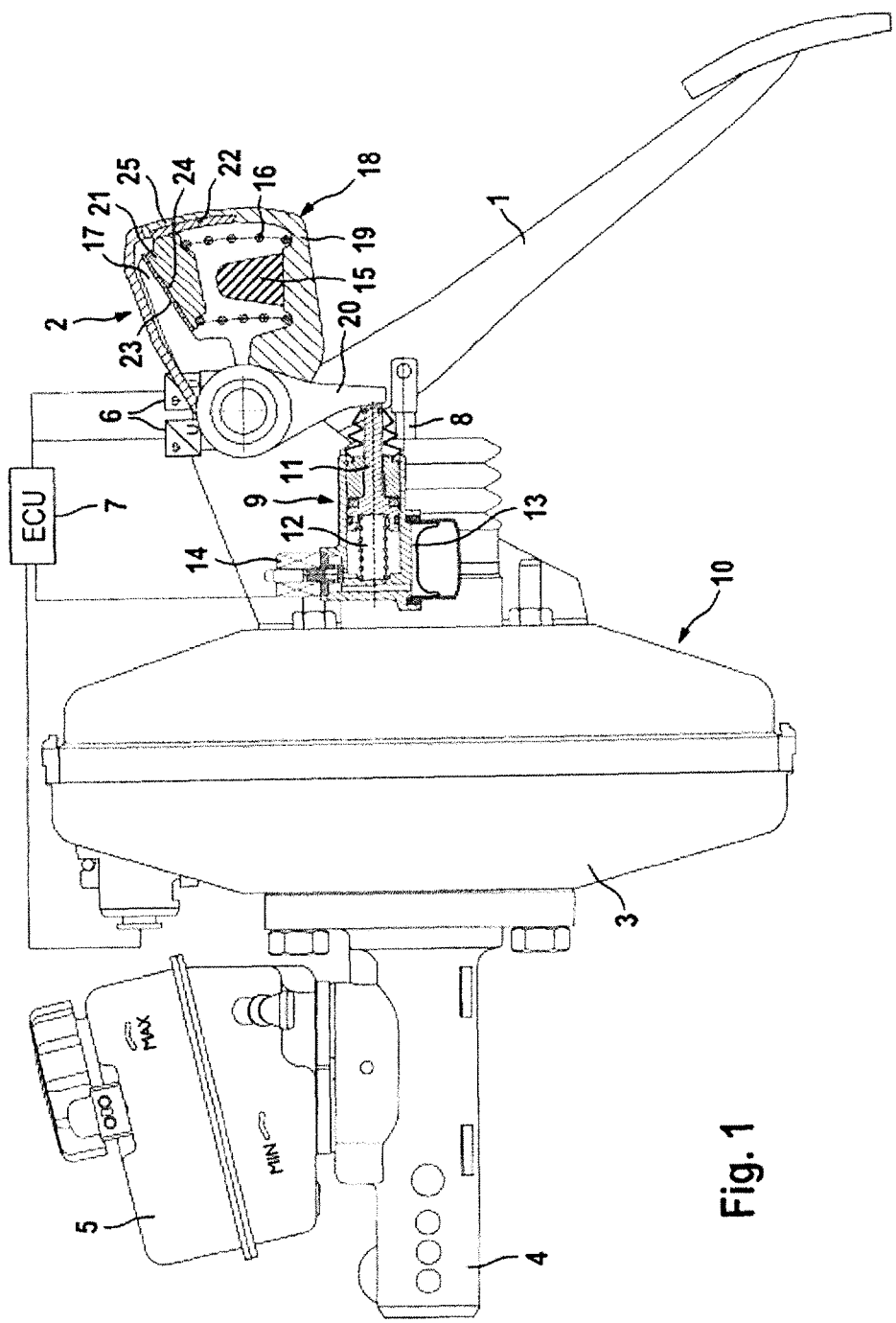
FIG. 1 shows a sectional illustration of the brake system which is known from the prior art and is of the generic type specified at the beginning.

In order to present a simpler and more cost-effective "brake-by-wire" type brake system, according to the exemplary embodiments described below there is provision that a force/travel characteristic of the pedal travel simulator 2, which is formed by at least one simulator element 15, is provided in a controllable fashion. Controlling the pedal characteristic allows additional travel with a limited force level to be enabled if the "brake-by-wire" system fails or a higher braking performance is necessary, with the result that separate deactivation of the pedal travel simulator in the fallback level no longer has to take place outside the "brake-by-wire" operating mode according to the described prior art. It is therefore particularly advantageous that there is no longer any need for a device for deactivating or activating the pedal travel simulator, as a result of which monitoring thereof can also be dispensed with.

The force/travel characteristic, i.e. the pedal travel, is controlled in a force-dependent fashion in the exemplary embodiments described below, with the result that, starting from a predetermined foot force applied to the brake pedal 1, prolongation of the pedal travel is made possible and the reaction force which occurs in the process does not exceed a defined limiting value.

The pedal travel simulator 2 is arranged between a component, which is fixed to the vehicle, of the pedal unit, referred to as the pedal mount 27, and the brake pedal 1 or a component 26 which can rotate coaxially with respect to the brake pedal 1 and is in the form of a lever. Basically, under corresponding spatial conditions it is possible to couple the pedal travel simulator 2 directly to the pedal mount 27 and to the brake pedal 1. Under certain circumstances it is also possible to use a component which is not part of the pedal unit as the component which is fixed to the vehicle.

Figure 2:
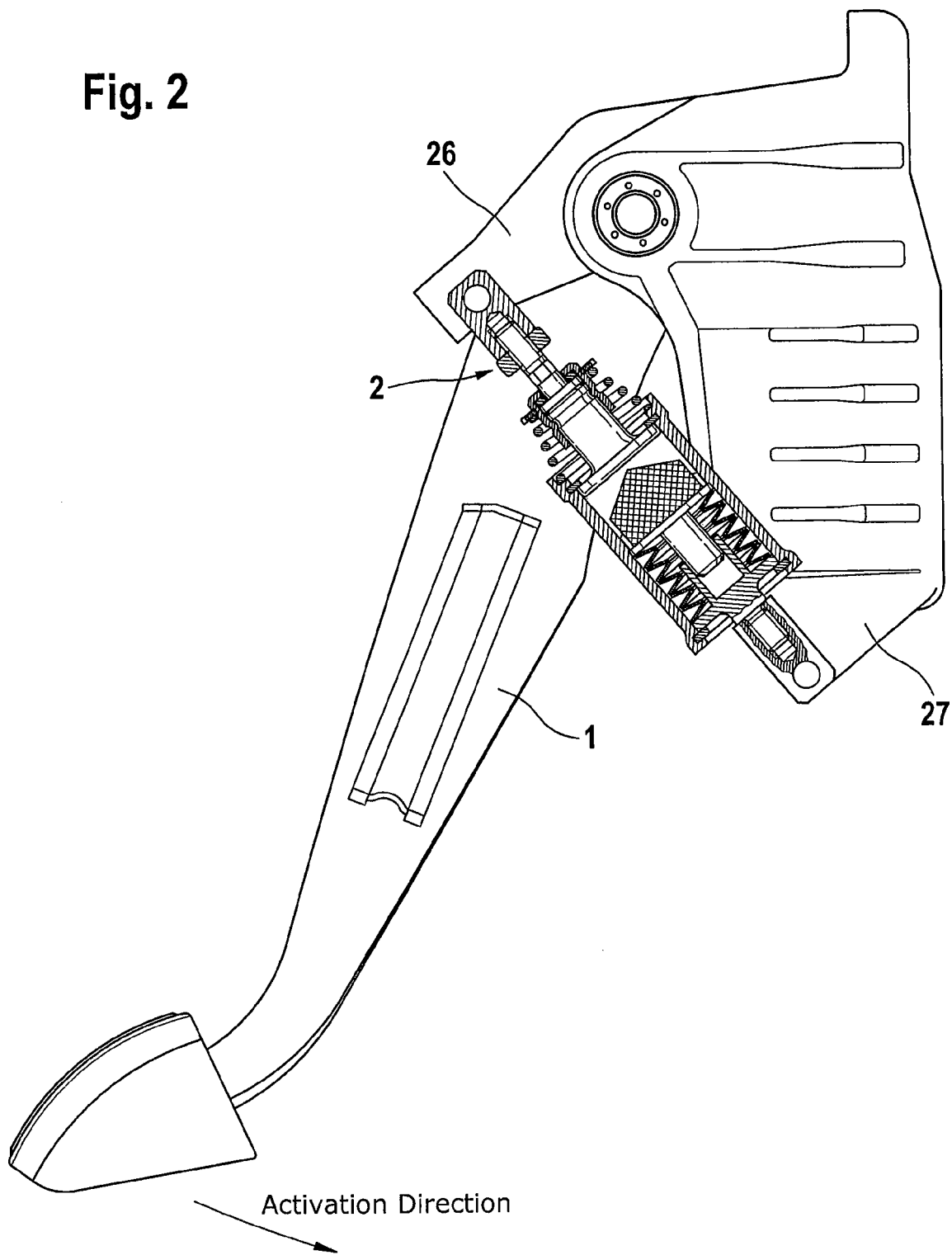
FIG. 2 shows a simplified schematic side view of the arrangement of the pedal travel simulator of the brake system according to the invention according to a first exemplary embodiment.
Figure 3:
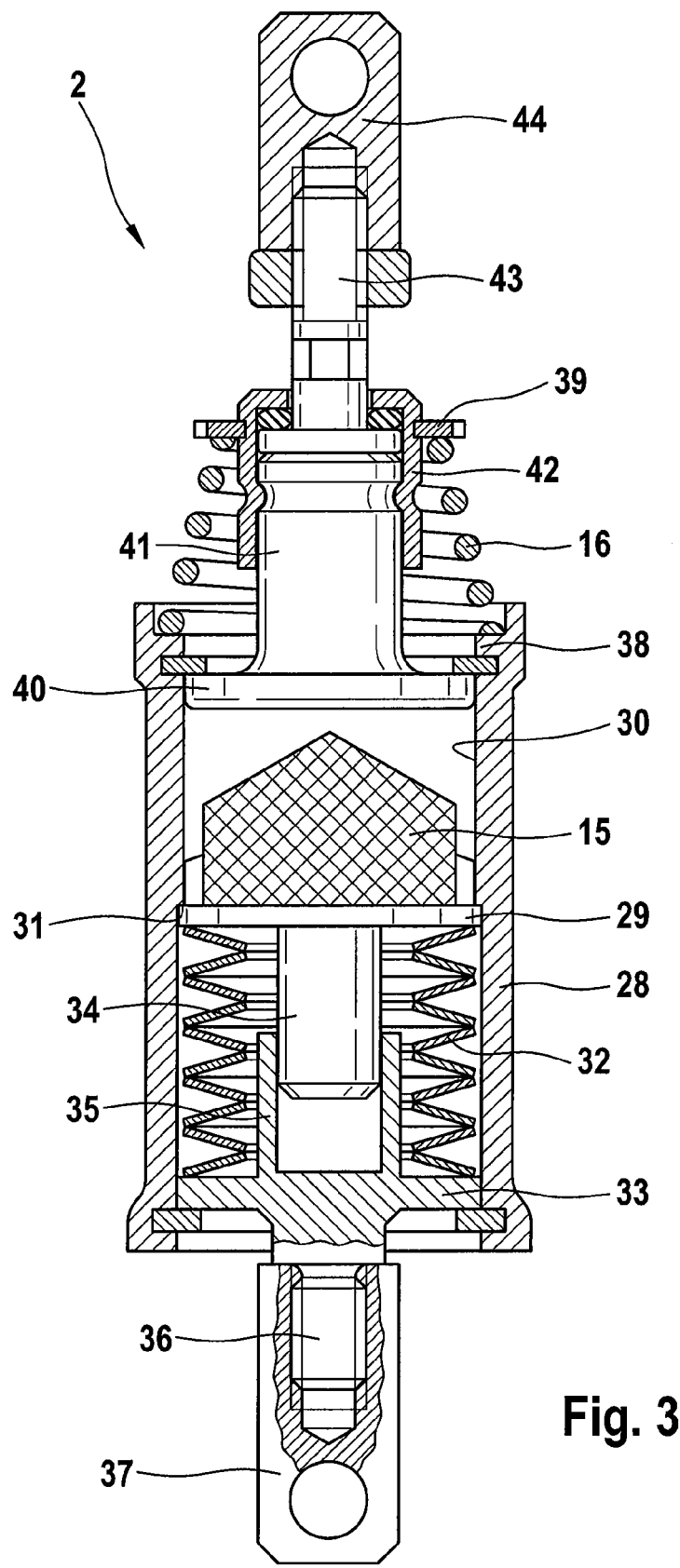
FIG. 3 shows an enlarged sectional illustration of the pedal travel simulator according to FIG. 2.

FIG. 2 shows a simplified schematic side view of the arrangement of the pedal travel simulator 2 according to a first exemplary embodiment, which is illustrated in an enlarged form in FIG. 3.

As is apparent from FIG. 3, the pedal travel simulator 2 according to the first exemplary embodiment has an essentially sleeve-shaped housing 28 in which a first disk-shaped activation element 29 which supports the simulator element 15 is arranged in a displaceable fashion. In this context, a stop 31, which is provided on an inner wall 30 of the housing 28, limits the movement of the activation element 29 which is secured against the stop 31 by a prestressed spring element 32 which is provided as a spring packet. The prestressed spring element can be replaced, within the scope of the invention, by any other spring element which can be compressed starting from a predetermined foot force applied to the brake pedal 1. An elastomer or a combination of springs is possible, for example, as a spring element.

The spring packet 32, which has a plurality of disk springs connected in series in this exemplary embodiment, is supported at its end on a second activation element 33 which has a hollow-cylindrical projection 35 for guiding a centrally arranged cylindrical protrusion 34 of the first activation element 29. For the purpose of attachment to the pedal mount 27, a threaded protrusion 36 is integrally formed onto the second activation element 33, which threaded protrusion 36 can be screwed into an attachment element 37.

A restoring spring 16, which serves to position the brake pedal 1 and to make available a response force, is supported in this exemplary embodiment on a collar 38 of the housing 28 and on a stop 39.

As is apparent from FIG. 3, the pedal travel simulator 2 has a further, third activation element 40 onto which the simulator element 15 is pressed. A cylindrical protrusion 41 of the third activation element 40 is connected by means of a connecting element 42 to a threaded rod 43 which can be screwed into an attachment element 44 in order to attach the pedal travel simulator 2 to the lever 26. The stop 39 of the restoring spring 16 is provided attached to the connecting element 42.

When the brake pedal 1 is activated by the vehicle driver in the activation direction, the restoring spring 16 is compressed by the simultaneous activation of the lever 26, and the third activation element 40 is displaced in the direction of the simulator element 15.

As a result of the bending of the spring packet 32, prolongation of the pedal travel is possible and an additional travel can be enabled if the "brake-by-wire" system fails or a higher braking performance is necessary. As a result, there is no longer any need for an additional device for deactivating or activating the pedal travel simulator 2, as a result of which monitoring thereof is dispensed with. In contrast to the known brake system, the pedal travel simulator 2 is therefore also active in the fallback level and moves whenever the brake pedal is activated.

Figure 7:
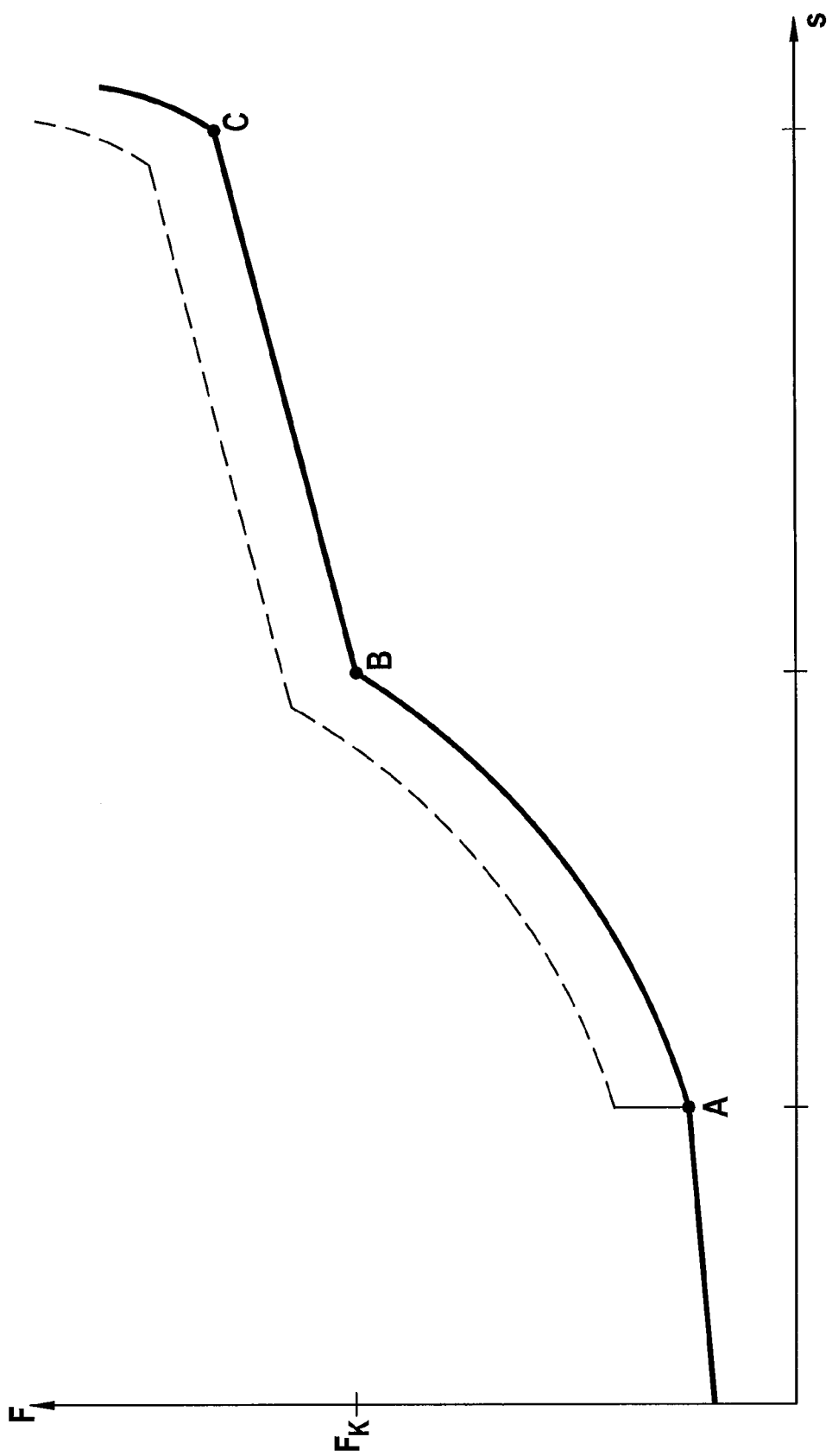
FIG. 7 shows a force/travel diagram of the brake system according to aspects of the invention.
Figure 9:
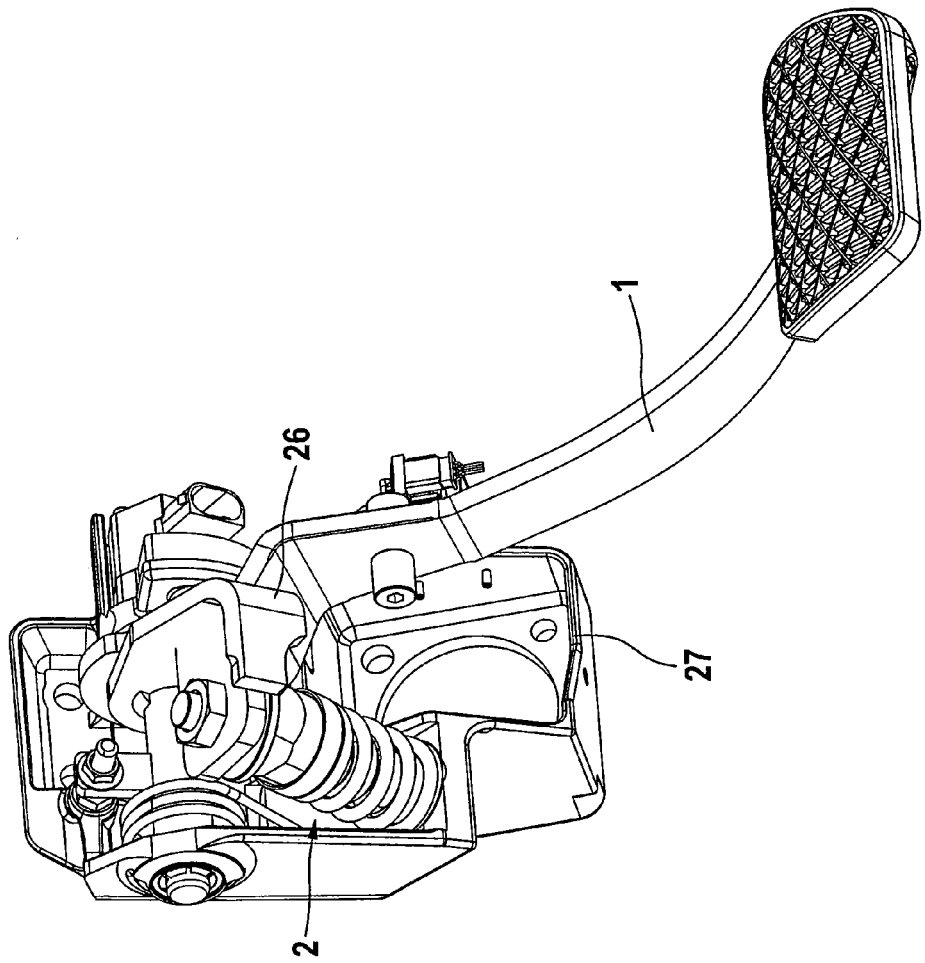
FIG. 9 shows the pedal unit according to FIG. 8 in another view.
Figure 8:
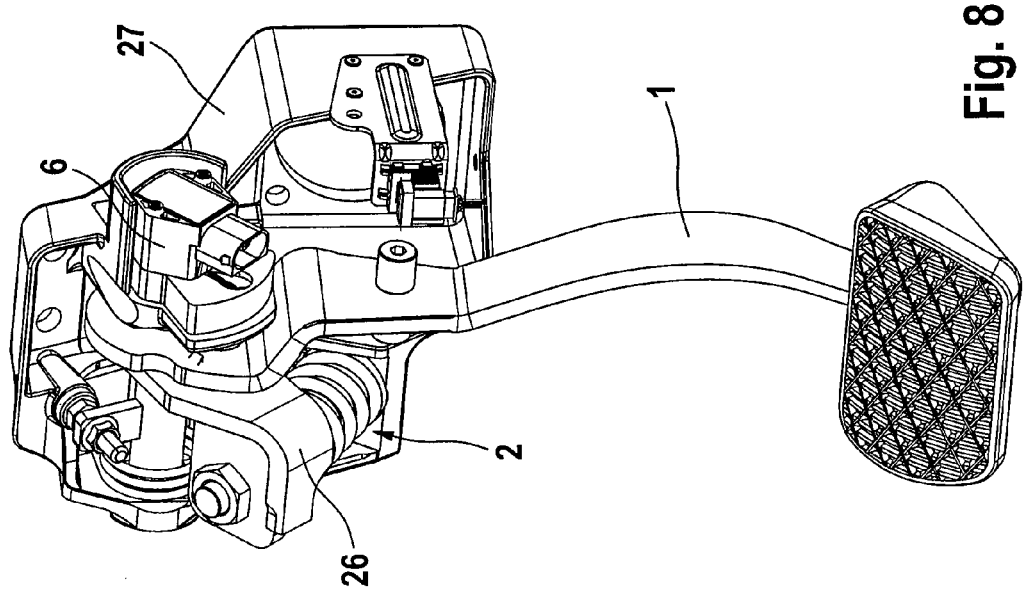
FIG. 8 shows a pedal unit according to a fourth exemplary embodiment.

The characteristic curve of the brake system which is shown in FIG. 7 and which is explained in more detail below is virtually the same in the "brake-by-wire" operating mode and in the fallback level. In the fallback level all that is necessary is to add a force component of the brake booster 3, which component advantageously decouples the feedback to the driver in certain operating modes. Such brake boosters are known, for example, as a mechanical braking assistant. The characteristic curve in the fallback level is illustrated by dashes in FIG. 7.

Figure 4:
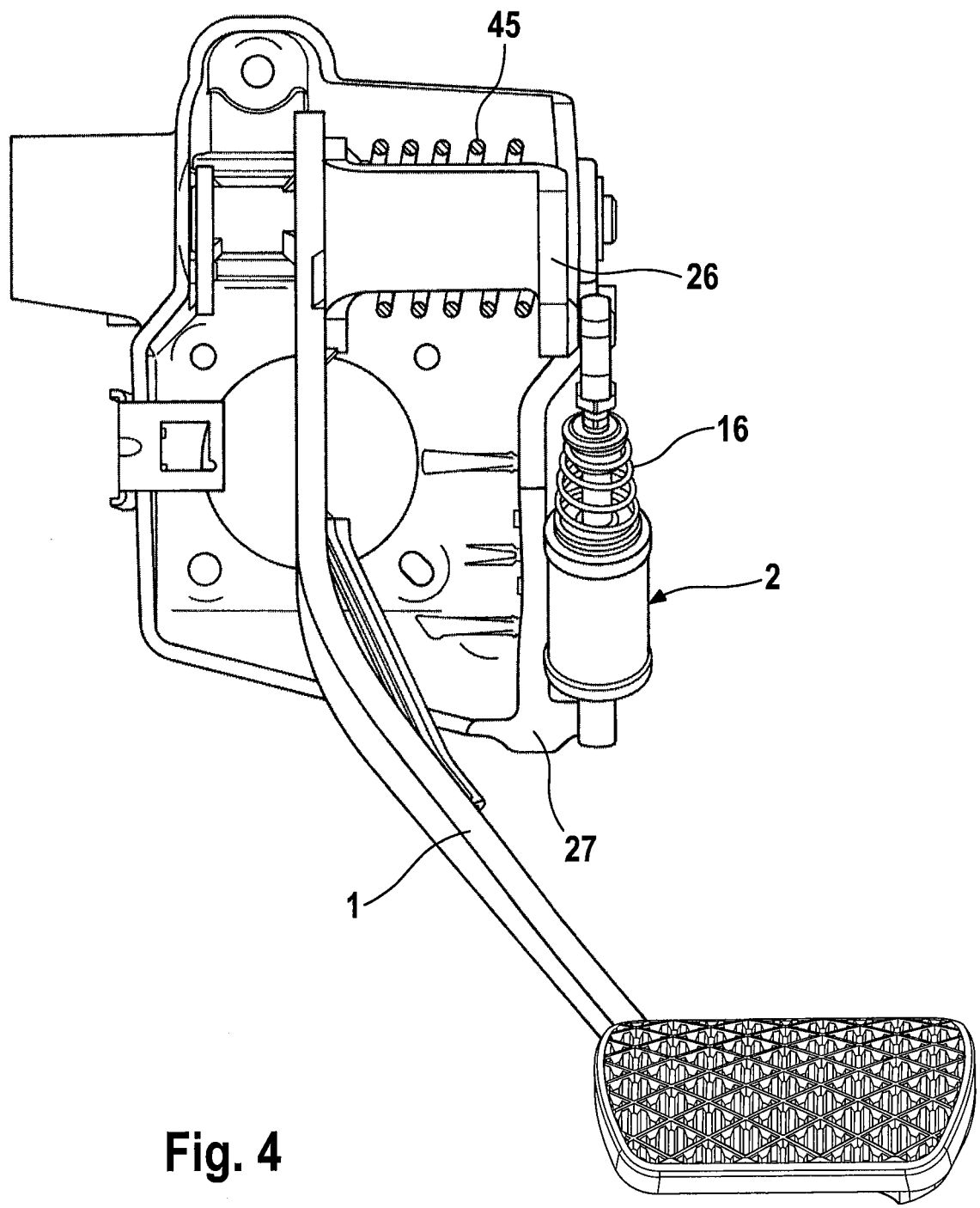
FIG. 4 shows a simplified schematic front view of the arrangement of the pedal travel simulator of the brake system according to aspects of the invention according to the first exemplary embodiment in accordance with FIG. 2.

FIG. 4 shows a simplified schematic front view of the arrangement of the pedal travel simulator 2 of the first exemplary embodiment. It is apparent that the pedal travel simulator 2 is arranged outside the brake pedal 1 and the pedal mount 27. The pedal travel simulator 2 can also be advantageously provided within the pedal mount 2, with the result that the installation space of the entire pedal unit can be reduced further. In addition it is also conceivable to couple the pedal travel simulator 2 directly to the brake pedal 1.

In addition to the restoring spring 16, a further restoring spring 45 can be provided which is not directly arranged on the pedal travel simulator 2. It is basically also possible to allow the restoring spring 16 to be dispensed with, with the result that the restoring spring 45 entirely performs the function with respect to the response force and the restoring force.

Figure 5:
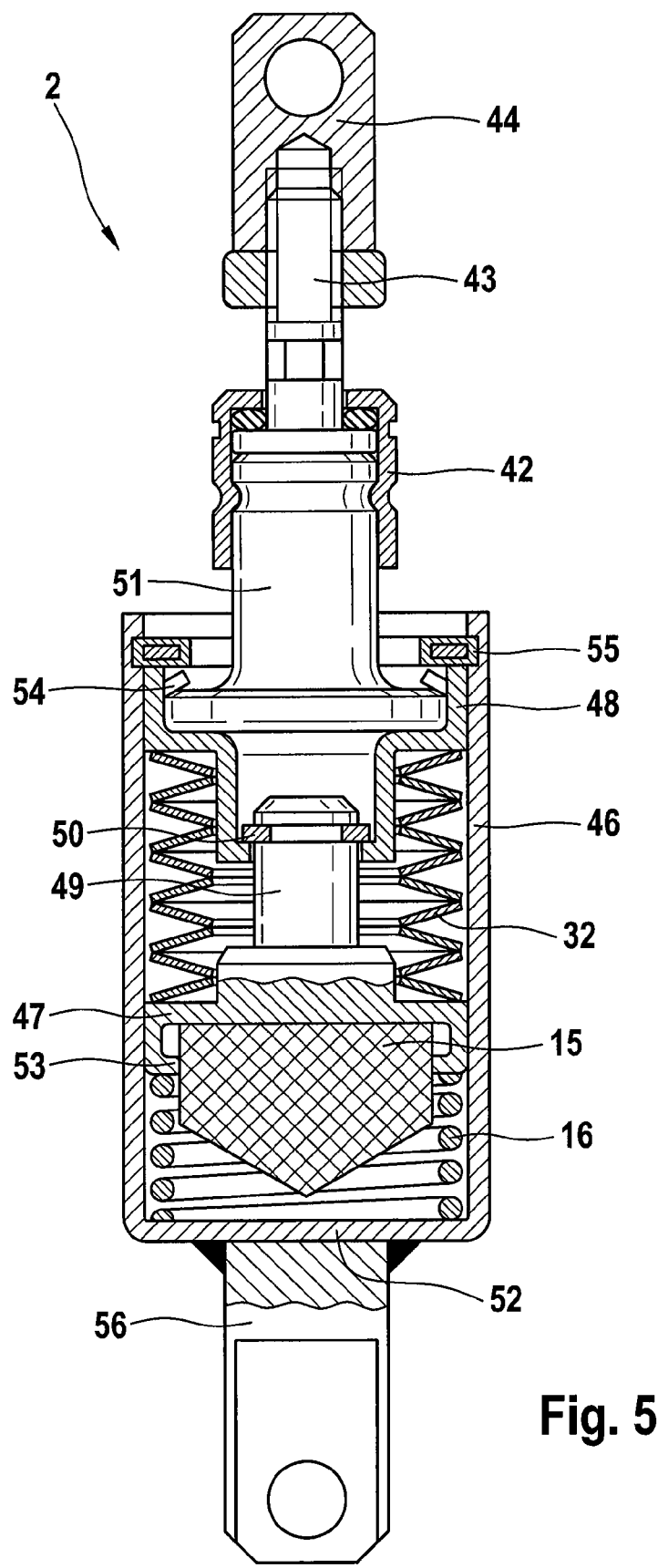
FIG. 5 shows a sectional illustration of a pedal travel simulator according to a second exemplary embodiment.
Figure 6:
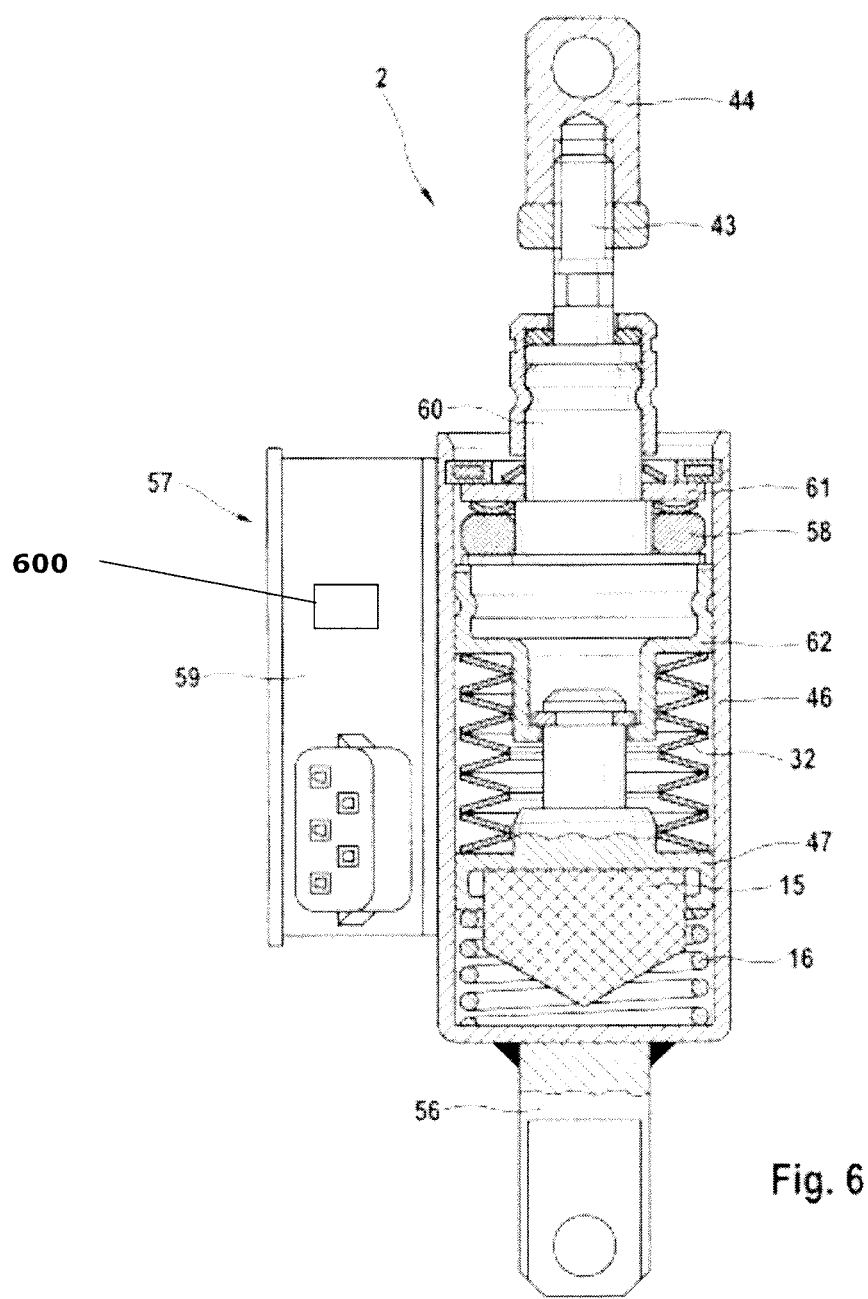
FIG. 6 shows a sectional illustration of a pedal travel simulator according to a third exemplary embodiment.

FIGS. 5 and 6 each show a sectional illustration of a pedal travel simulator 2 according to a second and a third exemplary embodiment, the function of which is the same as that of the first exemplary embodiment. Details will be given below only on the structural differences. Identical components are provided with identical reference symbols.

According to FIG. 5 it is apparent that the restoring spring 16 is provided in a housing 46 of the pedal travel simulator 2.

Furthermore, a first, essentially disk-shaped activation element 47 which supports the simulator element 15 is provided with a second activation element 48 and the spring packet 32 as a unit composed of securely joined parts, said unit advantageously constituting a premountable assembly. For securely joining the parts, the first activation element 47 has a cylindrical protrusion 49 which projects through an opening in the second activation element 48 and is secured therein by means of an attachment ring 50.

When activation occurs, the second activation element 48, and therefore also the spring packet 32 and the first activation element 47, are pushed by means of a further activation element 51 which is connected to a threaded rod 43 by the connecting element 42 which is described with respect to the first exemplary embodiment.

The restoring spring 16 is supported between a collar 53 which is integrally formed onto the first activation element 47 and a side wall 52 of the housing 46.

Furthermore, it is apparent from FIG. 5 that the activation element 51 is attached to the second activation element 48 by shaped clips 54 of the second activation element 48. The unit composed of secured-together parts and the restoring spring 16 are secured in a captive fashion in the housing 46 by means of a stop 55.

For the purpose of attachment to the pedal mount 27, an attachment element 56 is attached to an outer side of the side wall 52, for example by welding on.

It becomes clear that the second exemplary embodiment differs from the first in that, when activation occurs, the completely securely joined structural unit comprising the first and the second activation elements 47, 48 and the spring packet 32 moves in the direction of the side wall 52 counter to the spring force of the restoring spring 16. The restoring spring 16 and the spring packet 32 are connected directly in series in this embodiment. As a result, a third activation element can be dispensed with and the design of the pedal travel simulator 2 can be simplified.

In contrast to FIG. 5, FIG. 6 shows a pedal travel simulator 2 which additionally has a travel sensor 57. The latter comprises a permanent magnet 58 as a signal generator and a sensor element 59 which is arranged on the housing 56. As is apparent from FIG. 6, the permanent magnet 58 is arranged secured between an element 60 and a stop disk 61 attached thereto. Other types of sensors can also be used for this function within the scope of the invention. Other functions, such as sensing brake pressure, can monitored using any brake pressure sensor 600 known to a person having ordinary skill in the art.

The element 60 and a second activation element 62 are connected to one another in a positively locking fashion as parts of the securely joined spring packet unit.

Since all the inner components of the pedal travel simulator 2 according to the described embodiments are moved when activation occurs, what are referred to as "creeping" errors can be avoided and additional monitoring of the function is not necessary.

FIGS. 8 to 13 show a further, fourth exemplary embodiment. FIGS. 8 to 10, 12 and 13 therefore merely show a pedal unit of the brake system with a pedal travel simulator 2 in various spatial illustrations, which pedal travel simulator 2 is partially illustrated in FIG. 11.

In contrast to the exemplary embodiments described above, this exemplary embodiment does not have a housing and is distinguished by a particularly simple design. The essential design of the pedal travel simulator 2 is apparent, in particular, from FIG. 11, said pedal travel simulator 2 having a first stepped and sleeve-shaped activation element 63 which supports the simulator element 15. A first step 64 serves, on the one hand, for accommodating the simulator element 15 and, on the other hand, for the abutment of a prestressed spring element 65 which fulfills the same function as the spring element 32 described above. As is apparent from FIG. 11, the spring element 65 comprises in this exemplary embodiment two helical compression springs 66, 67 which abut against a second stepped, disk-shaped activation element 68. The two activation elements 63 and 68 are provided securely joined by means of a shank 69, wherein the prestress of the spring element 65 secures the activation element 63, 68 against stops 70, 71 of the shank 69. In this context, the stop 70 is integrally formed onto the shank 69 and, for the purpose of positioning, engages in a very small step 72 on the second activation element 68. Steps 73, 74 formed on the opposite side serve to position the two compression spring ends.

A second and a third step 75, 76 of the first activation element 63 are embodied in such a way that the first activation element 63 is supported on the stop 71 by the prestress of the spring element 65. The stop 71 is secured on the shank 69 by means of a circlip 77 secured in a groove 78 in the shank 69.

The two activation elements 63 and 68 are provided with the spring element 65 and the shank 69 as a pre-mountable structural unit. For the purpose of attaching this structural unit to the pedal mount 27, the shank 69 is used which projects, with its end 79 provided as a thread, through a drilled hole in the pedal mount 27 and is attached to the pedal mount 27 by means of a nut 80, as is clearly apparent from FIG. 12.

Furthermore, the pedal travel simulator 2 has a third activation element 81 against which the simulator element 15 is pressed when activation occurs. A cylindrical protrusion 82, provided with a thread, on the third activation element 81 projects for the purpose of attaching a shoulder 84 of the lever 26 and is attached to a nut 83.

As is apparent, in particular, from FIGS. 10 and 13, the response force is provided here by means of a separate restoring spring 85 which is embodied as a leg spring.

A distance a is provided in an adjustable fashion between the simulator element 15 and the third activation element 81, with the result that the pedal characteristic curve can be adjusted in addition to the predefined properties of the spring elements of the pedal travel simulator. The adjustment is carried out by means of the cylindrical protrusion 82, provided with a thread, on the third activation element 81 and the nut 83.

The final position of the brake pedal 1 is defined by a pedal end stop 86.

Figure 15:
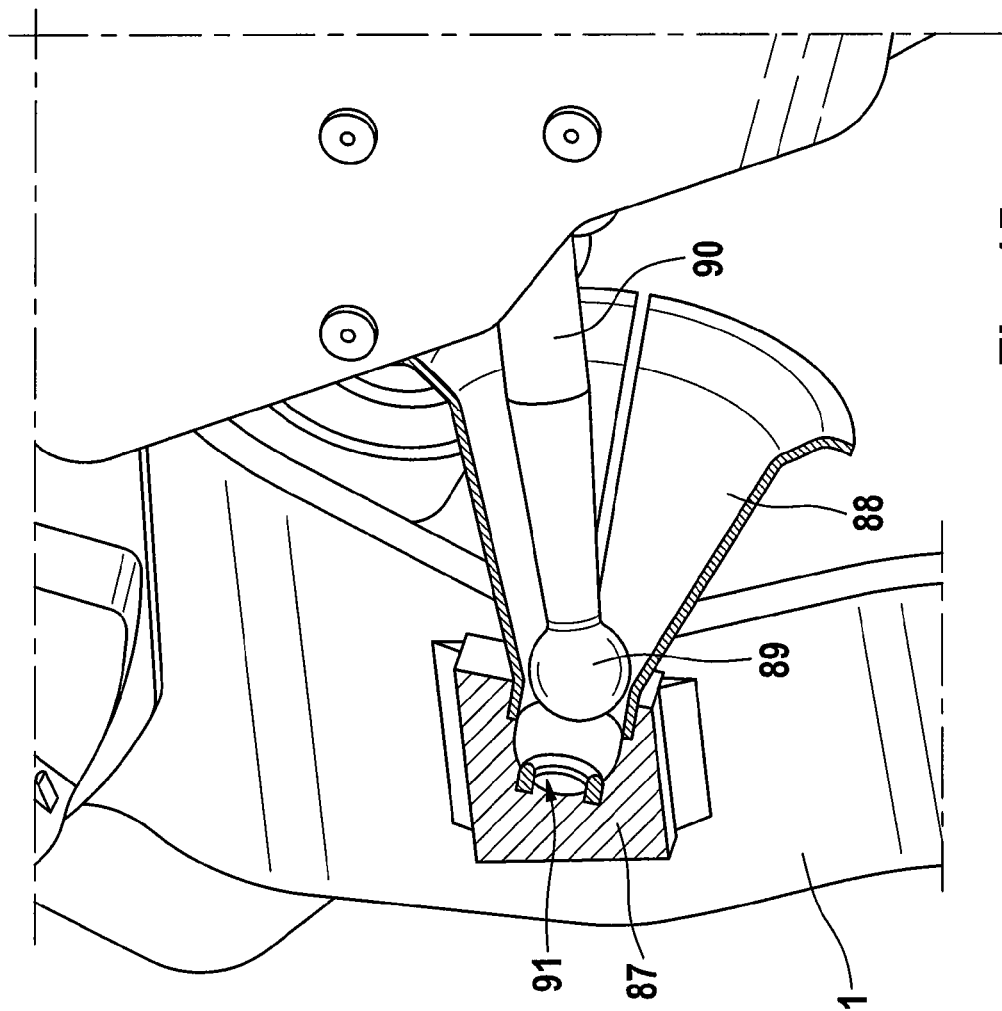
FIG. 15 shows an enlarged view of the pedal unit according to FIG. 14.
Figure 14:
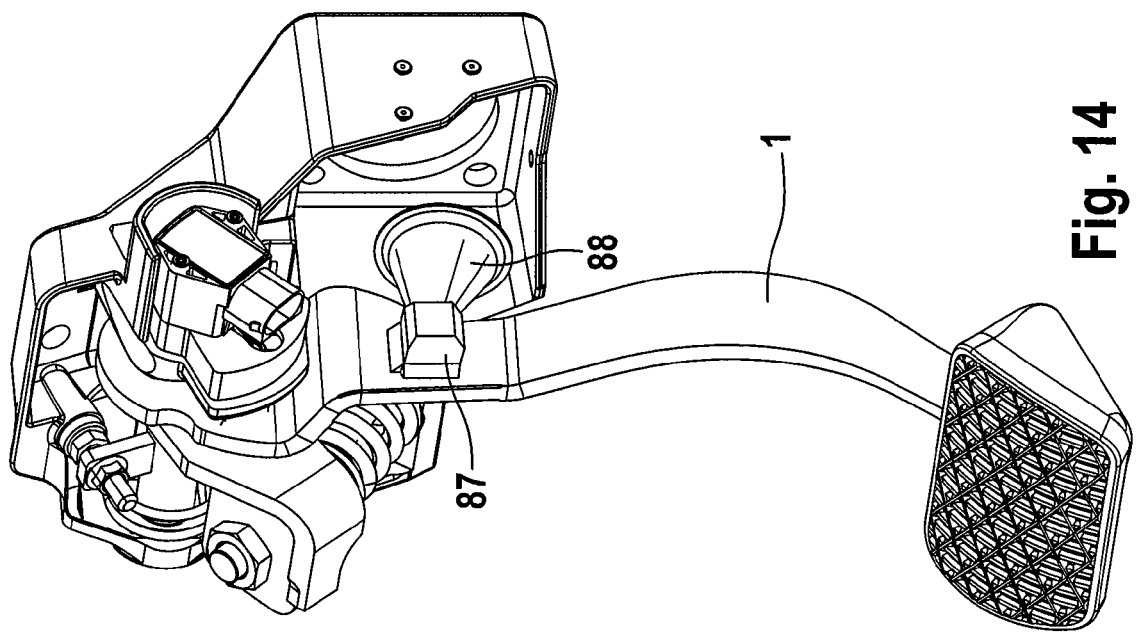
FIG. 14 shows a pedal unit according to a fifth exemplary embodiment.

FIGS. 14 and 15 show a pedal unit according to a fifth exemplary embodiment. In the text which follows, details are given only on the differences from the fourth exemplary embodiment since the rest of the design of the pedal unit is provided in the same way.

As is apparent, in particular, from FIG. 15, a securing element 87, which has a funnel-shaped receptacle 88, is attached to the brake pedal 1, preferably by welding, said funnel-shaped receptacle 88 being oriented in the direction of a piston rod 90 of the brake booster 3.

This receptacle 88 serves, on the one hand, to guide a piston rod end 89 of the piston rod 90 during the mounting of the pedal unit with the brake booster 3. On the other hand, the piston rod 90 is guided through the receptacle 88 and/or through the securing element 87 after connection to the brake pedal 1.

A damping element 91 in the form of a damping ring reduces noises when the piston rod end 89 is in contact with the securing element 87.

A further advantage here is that the brake pedal 1 is not weakened in the region of the piston rod connection.

The guidance of the piston rod 90 by means of the receptacle 88 or the securing element 87 safeguards the gap in the "brake-by-wire" operating mode, i.e. the decoupling of the force transmitting connection between the brake pedal 1 and the brake booster 3.

The parts which are important for the functioning of the pedal travel simulator 2 are moved during activation also in the embodiments described last, with the result that "creeping" faults are avoided and additional monitoring of the function is not necessary.

Figure 16:
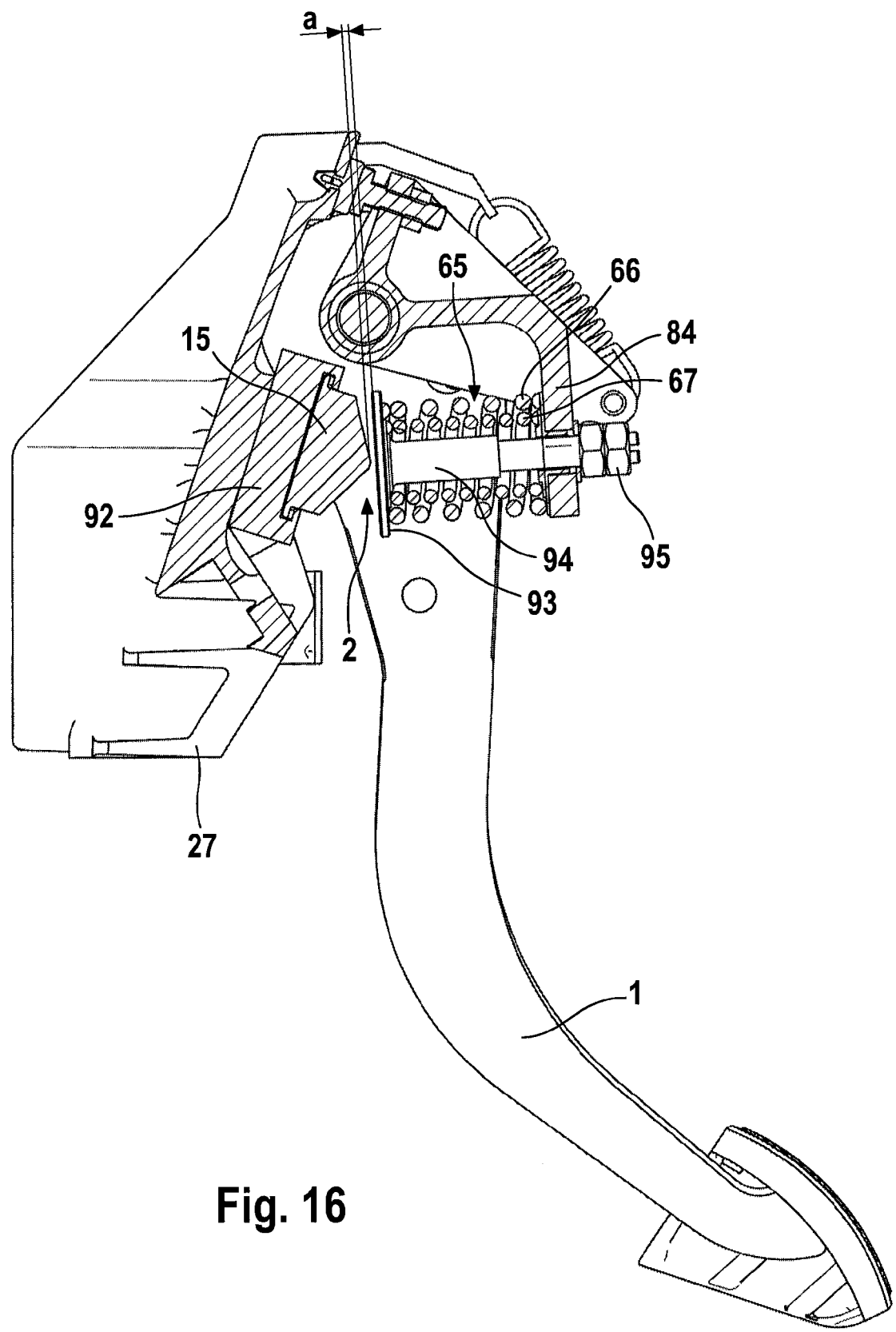
FIG. 16 shows a longitudinal section through a pedal unit according to a sixth exemplary embodiment.

FIG. 16 shows a longitudinal section through a pedal unit according to a sixth exemplary embodiment. The latter differs from the fourth exemplary embodiment in that the simulator element 15 is attached to the pedal mount 27 by means of a receptacle 92.

An activation element 93 is attached to the shoulder 84 by means of a shank 94, as a result of which the spring element 65 is positioned prestressed between the activation element 93 and the shoulder 84. As is apparent, the pedal travel simulator 2 according to this exemplary embodiment has a particularly simple design since just one activation element is provided.

Furthermore, the distance a between the simulator element 15 and the activation element 93 can be adjusted by means of the shank 94 and nuts 95 which are provided for the attachment thereof.

In contrast to the embodiments described above, according to one embodiment of the invention which is not shown, the control of the pedal travel can be provided as a function of the travel, with the result that, starting from a predetermined activation travel of the brake pedal 1, prolongation of the pedal travel simulator and therefore of the pedal travel is enabled.

FIG. 7 shows a force/travel diagram of all the embodiments of the brake system according to aspects of the invention. It is apparent that the characteristic curve rises linearly up to the point A when the restoring spring/restoring springs 16, 45, 85 is/are compressed. As soon as the activation element 40, 81 or the side wall 52 is pressed against the simulator element 15, the characteristic curve rises progressively (points A to B). If the foot force applied to the brake pedal 1 exceeds a force $F_K$ predefined by the spring force of the spring element 32, 65, the characteristic curve bends and extends between the points B and C with a significantly flatter gradient than at the section A to B.

The invention claimed is:
1. A brake-by-wire brake system for a motor vehicle comprising:
 a brake pressure generator which can be activated by a brake pedal of a pedal unit outside a brake-by-wire operating mode,
 a pressure source which can be actuated by an electronic control unit in the brake-by-wire operating mode,
 a pedal travel simulator which interacts with the brake pedal and is formed by at least one simulator element, a first spring element and a restoring spring, and wherein the pedal travel simulator is configured to simulate a restoring force, which acts on the brake pedal independently of the actuation of the pressure source, in the brake-by-wire operating mode,
 wherein the first spring element is arranged between and in direct contact with both a first activation element, which is in contact with and supports the simulator element, and a second activation element which is attached indirectly to the brake pedal or to a second component that can rotate coaxially with respect to the brake pedal, wherein the first spring element is arranged in exclusively linear series with the restoring spring of the brake pedal and separated from the restoring spring by the first activation element, which is in direct contact with the restoring spring;

a cylindrical protrusion attached to and projecting from the first activation element toward and through an opening in the second activation element, and wherein a gap is provided between the simulator element and only a side wall of a housing of the pedal travel simulator, wherein the simulator element is an elastic element configured to be pressed into the sidewall of the housing of the pedal travel simulator.

2. The brake system as claimed in claim 1, wherein the exclusively linear series of springs is configured to provide a reaction force that does not exceed a defined limiting value.

3. The brake system as claimed in claim 1, wherein the pedal travel simulator is coupled to a first component which is fixed to the vehicle and to the brake pedal.

4. The brake system as claimed in claim 1, wherein the pedal travel simulator is arranged between a first component which is fixed to the vehicle and the second component, which can rotate coaxially with respect to the brake pedal.

5. The brake system as claimed in claim 3, wherein the first component is a part of the pedal unit.

6. The brake system as claimed in claim 2, wherein in order to prolong the pedal travel, the first spring element is provided which, starting from a predetermined foot force applied to the brake pedal, can be compressed and therefore permits prolongation of the pedal travel.

7. The brake system as claimed in claim 6, wherein the first spring element is provided as a prestressed spring.

8. The brake system as claimed in claim 7, wherein the prestressed spring element is provided as a spring packet composed of at least one disk spring or at least one helical compression spring.

9. The brake system as claimed in claim 6, wherein the first spring element is provided as an elastomer.

10. The brake system as claimed in claim 7, wherein the first spring element is secured by a stop between the first activation element and the second activation element.

11. The brake system as claimed in claim 4, wherein the first spring element is arranged between the second component and the first activation element, and the simulator element is attached by means of a receptacle to the first component.

12. The brake system as claimed in claim 1, wherein the pedal travel simulator has a travel sensor.

13. The brake system as claimed in claim 12, wherein the travel sensor comprises a permanent magnet as a signal generator and a sensor element.

14. The brake system as claimed in claim 1, wherein a further restoring spring of the brake pedal is provided on the pedal travel simulator or as a separate spring element.

15. The brake system as claimed in claim 1, wherein a securing element, which has a funnel-shaped receptacle which is oriented in the direction of a piston rod of the brake booster, is attached to the brake pedal.

* * * * *